(12) United States Patent
Prough

(10) Patent No.: US 6,453,260 B1
(45) Date of Patent: Sep. 17, 2002

(54) APPARATUS AND METHOD FOR COLLECTING MOTOR TEST DATA

(75) Inventor: David Michael Prough, Leo, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/558,442

(22) Filed: Apr. 25, 2000

(51) Int. Cl.[7] ............................. H02H 5/04; H02H 7/00
(52) U.S. Cl. ......................... 702/132; 361/23; 361/25; 318/472
(58) Field of Search ................... 702/132, 176; 361/24, 27, 106, 25, 23, 93.8; 318/472

(56) References Cited

U.S. PATENT DOCUMENTS

| | | | |
|---|---|---|---|
| 5,220,478 A | * | 6/1993 | Innes et al. ............... 361/93 |
| 5,644,510 A | * | 7/1997 | Weir ........................ 702/132 |
| 5,952,803 A | | 9/1999 | Canada et al. |
| 6,078,874 A | | 6/2000 | Piety et al. |
| 6,249,104 B1 | | 6/2001 | Janicek |
| 6,297,742 B1 | | 10/2001 | Canada et al. |

* cited by examiner

Primary Examiner—Marc S. Hoff
Assistant Examiner—Paul L Kim
(74) Attorney, Agent, or Firm—Karl Vick, Esq.; Armstrong Teasdale LLP

(57) ABSTRACT

A system for motor thermal protector device performance test data collection includes a microprocessor configured to measure elapsed times of reset and trip power cycles of a motor winding through a thermal protector device. An operator interface terminal is coupled to the microprocessor and includes a display and input selectors for recalling a predetermined number of elapsed reset and trip times stored in a system memory.

20 Claims, 2 Drawing Sheets

APPARATUS AND METHOD FOR COLLECTING MOTOR TEST DATA

BACKGROUND OF THE INVENTION

This invention relates generally to testing methods and systems for determining motor performance parameters and, more particularly, to a system and method for testing and collecting data relating to performance of thermal protector devices for electric motors.

Electric induction motors typically include motor windings housed in a stator assembly within a motor shell. As the windings are energized, a voltage is induced in a rotor inserted within the stator, and a resultant magnetic field causes the rotor to rotate within the stator and power devices attached to a rotor shaft that extends from, and rotates with, the rotor. A thermal protector device is typically connected between a motor power supply and the motor windings to protect against excessive heat buildup in the windings as current flows through the windings.

As current flows through the motor windings and heats the windings, current also flows through the thermal protector device and heats the device. When the thermal protector device reaches a pre-determined temperature, the device opens or "trips" and disconnects the windings from the motor circuit to prevent damage to the motor. As the thermal protector device cools, it eventually closes or "resets" and completes the motor circuit to energize the windings. As current flows through the thermal device and windings, heat generated by the current flowing through the device causes the thermal protector to trip and again open the circuit, and as the thermal protector device cools it again resets and closes the circuit. Hence the thermal protector device cycles motor power on and off to prevent overheating of the motor in use.

To ensure customer satisfaction, motor performance, and motor reliability, a number of motor characteristics are typically tested before motors are delivered to customers to determine whether the motor meets certain specifications, including but not limited to UL (Underwriter's Laboratory) certification standards. At least one UL standard relates to thermal protector devices for motors, and entails recording of the first five "on" or reset times and the first five "off" or trip times of a motor power cycle through the thermal protector device in use. Conventionally, timing of power cycles has been accomplished with complicated electromechanical systems including ten electromechanical timers for display to an operator for recording the five reset and five trip power cycles of the motor. Electromechanical timers are very expensive, in short supply, and require some effort to maintain and ensure the reliability of system measurements.

Accordingly, it would be desirable to provide a lower cost and less complicated system and method for collecting data relating to the operation of a thermal protector device for a motor.

BRIEF SUMMARY OF THE INVENTION

In an exemplary embodiment of the invention, a system is provided for testing thermal protector device performance in a motor including a motor winding and a thermal protector device coupled thereto that cycles between a reset or "on" position and a trip or "off" position to cycle power to the motor winding and prevent motor damage from overheating of the motor winding. The system includes a microprocessor configured to measure elapsed times of reset and trip power cycles of the motor winding through the thermal protector device, a memory for storing and recalling the elapsed reset and trip times, and an operator interface terminal coupled to the microprocessor. The operator interface terminal includes a display and at least one input selector for displaying the elapsed reset and trip times in response to user manipulation of the input selector.

More specifically, the microprocessor is configured to measure and store a pre-determined number of thermal protector device reset and trip times in the memory, such as, for example, the five reset and trip times required by UL standards.

After the predetermined number of reset and trip times are stored in the memory, the microprocessor is configured to store and display a last timed power cycle of the motor winding, as well as a total number of timed power cycles of the motor winding through the thermal protector device. A current sensor is coupled to the microprocessor and configured for coupling to the motor in series with the thermal protector. The current sensor provides a signal to the microprocessor that triggers measuring the elapsed reset times and the elapsed trip times of the thermal protector device.

Therefore, a lower cost, less complicated and user-friendly system is provided for collecting data relating to the operation of a thermal protector device for a motor.

DETAILED DESCRIPTION OF THE INVENTION

Figure 1:
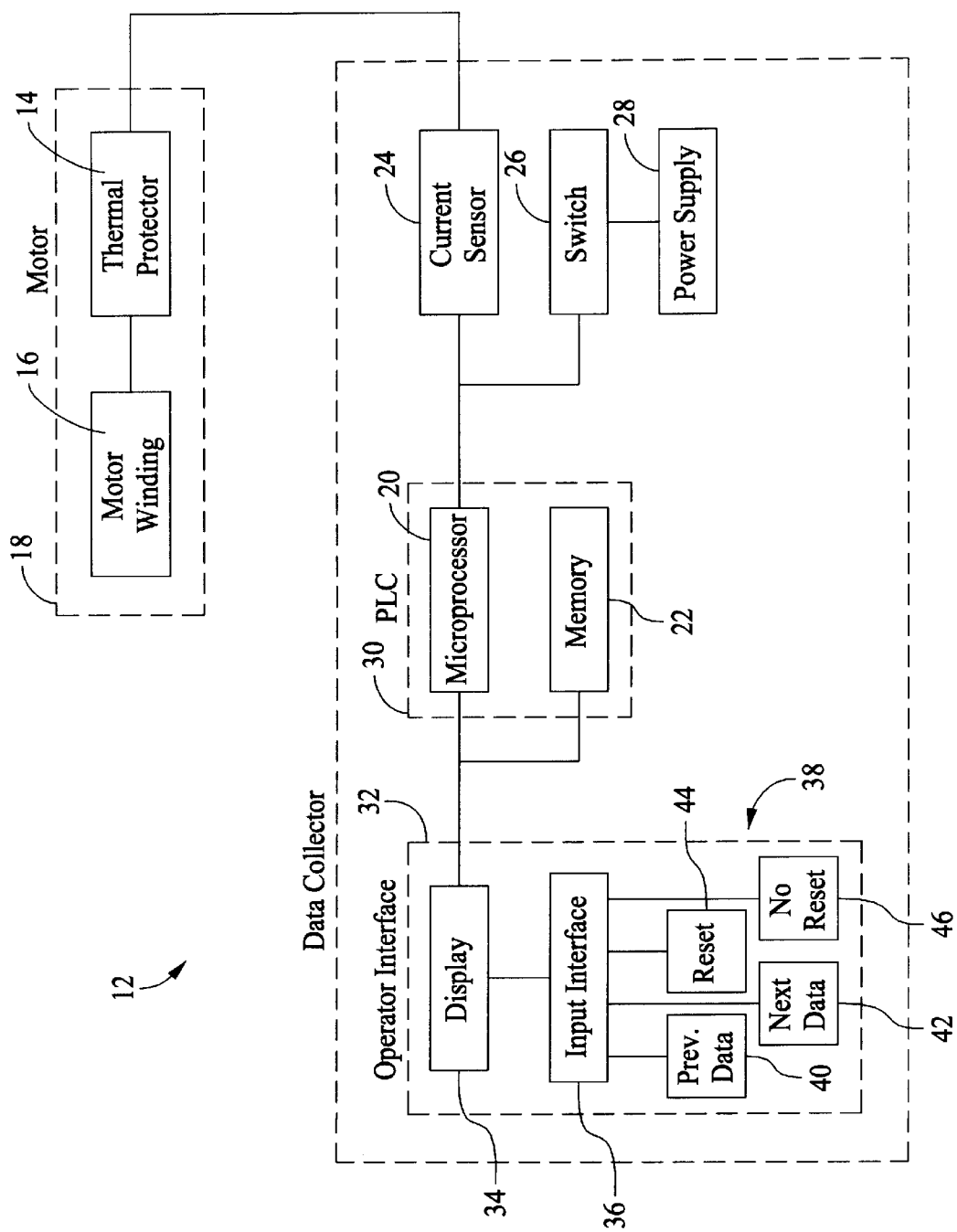
FIG. 1 is a schematic illustration of a system for collecting motor thermal protector device test data.

FIG. 1 schematically illustrates a data collector system 12 for collecting performance test data of a thermal protector device 14 coupled in sequence to a motor winding 16 of a motor 18. Motor 18 is a known electric induction motor including a stator (not shown) and a rotor (not shown) rotatably mounted in the stator. The stator includes motor winding 16 formed by a number of turns of magnet wire (not shown), and thermal protector device 14 electrically is coupled to motor winding 16. When motor winding 16 is energized, current flowing therethrough generates a magnetic field about the rotor. The magnetic field induces a voltage in the rotor and causes the rotor to rotate within the stator. A rotor shaft (not shown) is connected to the rotor and driven components (not shown) are coupled to the rotor so that the motor may be power the components. In various embodiments, motor 18 includes one or more windings to vary the performance of the motor, and may include start, main, and auxiliary windings. Also, in a particular embodiment, motor 18 is a DC induction motor, although it is contemplated that the system and method set forth herein could be practiced with AC motors within the scope of the present invention.

Thermal protector device 14 is a known thermistor or temperature responsive device electrically coupled in sequence with motor winding 16 and responsive to heat generated by current flowing through thermal protector device 14 and motor winding 16. When an operating temperature of thermal protector device 14 reaches a predetermined level, thermal protector device 14 transitions or switches from a "reset" or "on" position or state in which an electrical circuit through motor winding 16 is completed through thermal protector device 14, thereby energizing motor winding 16, to a "trip" or "off" position or state wherein the electrical circuit is broken through thermal protector device 14, thereby de-energizing motor winding 16 and preventing damage to motor 18 due to overheating of motor winding 16. As thermal protector device 14 cools in the trip position, thermal protector device 14 resets and completes the motor circuit through motor winding 16. Thus, thermal protector device 14 cycles motor power on and off by cycling between the reset and trip positions, respectively. In one embodiment, thermal protector device 14 is integrally mounted within motor 18. In an alternative embodiment, thermal protector device 14 is externally coupled to motor 18.

Data collector system 12 includes a microprocessor 20 and a memory 22 configured for measuring and storing elapsed reset and trip times of motor thermal protector device 14 that is coupled to data collector system 12. Microprocessor 20 and memory 22 are powered by a conventional 115V AC power source (not shown), and a conventional current sensor 24 and solid state switch 26 is coupled to microprocessor 20 and coupled in series with motor thermal protector device 14. In one embodiment, motor 18 is a DC motor and data collection system 12 further includes a 24V DC power supply 28 to energize motor 18 for testing purposes. Current sensor 24 generates an input signal to microprocessor 20 to stop and start timing of reset and trip cycles of thermal protector device 14. In alternative embodiments for use in testing AC motors, power supply 28 may be unnecessary, or a different power supply may be required, as will be readily appreciated by those skilled in the art.

When thermal protector device test data collection begins, switch 26 is closed to electrically couple power supply 28 to motor thermal protector device 14 and to motor winding 16. Because motor thermal protector device 14 is initially in the reset or on position, current flows through the motor circuit and current sensor 24 sends an input signal to microprocessor 20 to begin timing operations. Using an internal clock function, microprocessor 20 counts an elapsed time from closing of current switch 26 until heat generated by current flowing through thermal protector device 14 causes it to trip or open, breaking the motor circuit and altering the input signal from current sensor 24. Microprocessor 20 then counts an elapsed time from altering of the input signal from current sensor 24 until heat dissipation from thermal protector device 14 causes it to close or reset, completing the motor circuit and again altering the input signal. Thus, as thermal protector device 14 switches from the reset position to the trip position, and vice versa, the corresponding input signals from current sensor 24 trigger timing operations of microprocessor 20. In lieu of current sensor 24 to monitor energization of motor winding 16, other known electrical elements and circuits could be used to monitor motor energization, including, but not limited to, voltage sensing elements and circuits. Memory 22 is coupled to microprocessor 20 for storage and recall of reset and trip times, as explained further below.

In one embodiment, microprocessor 20 and memory 22 are part of a low cost programmable logic controller ("PLC") unit 30 adapted for thermal protector data collection, in which memory 22 constitutes discrete registers (not shown), such as, for example, five registers for storing reset times and five registers for storing the respective first five reset and trip times of thermal protector device that are required by UL standards. In alternative embodiments, other known microprocessor 20 and memory 22 architectures are used in the present invention.

Microprocessor 20 and memory 22 are coupled to an operator interface terminal 32 including a display 34 and an input interface 36. Display 34 is a known display device, including but not limited to a liquid crystal display (LCD) device or light emitting diode (LED) device to display messages and information to a user. Input interface 36 includes a plurality of input selectors 38, which in a particular embodiment include a PREVIOUS DATA input selector 40, a NEXT DATA input selector 42, a RESET input selector 44, and a NO RESET input selector 46 having the functions described hereinafter. In a further embodiment, input selectors 38 are touch-activated keypads mounted on an outer face (not shown) of a data collector shell enclosure (not shown) for easy access to input commands to data collector system 12 via user manipulation of input interface 36 in a self-contained data collection unit. Other known input selectors 38, including but not limited to buttons, dials, knobs, levers, and switches are used in alternative embodiments of the invention, whether in self-contained data collection units or remotely coupled selector mechanisms, such as a keyboard, to select input commands and control features of data collector system 12.

Figure 2:
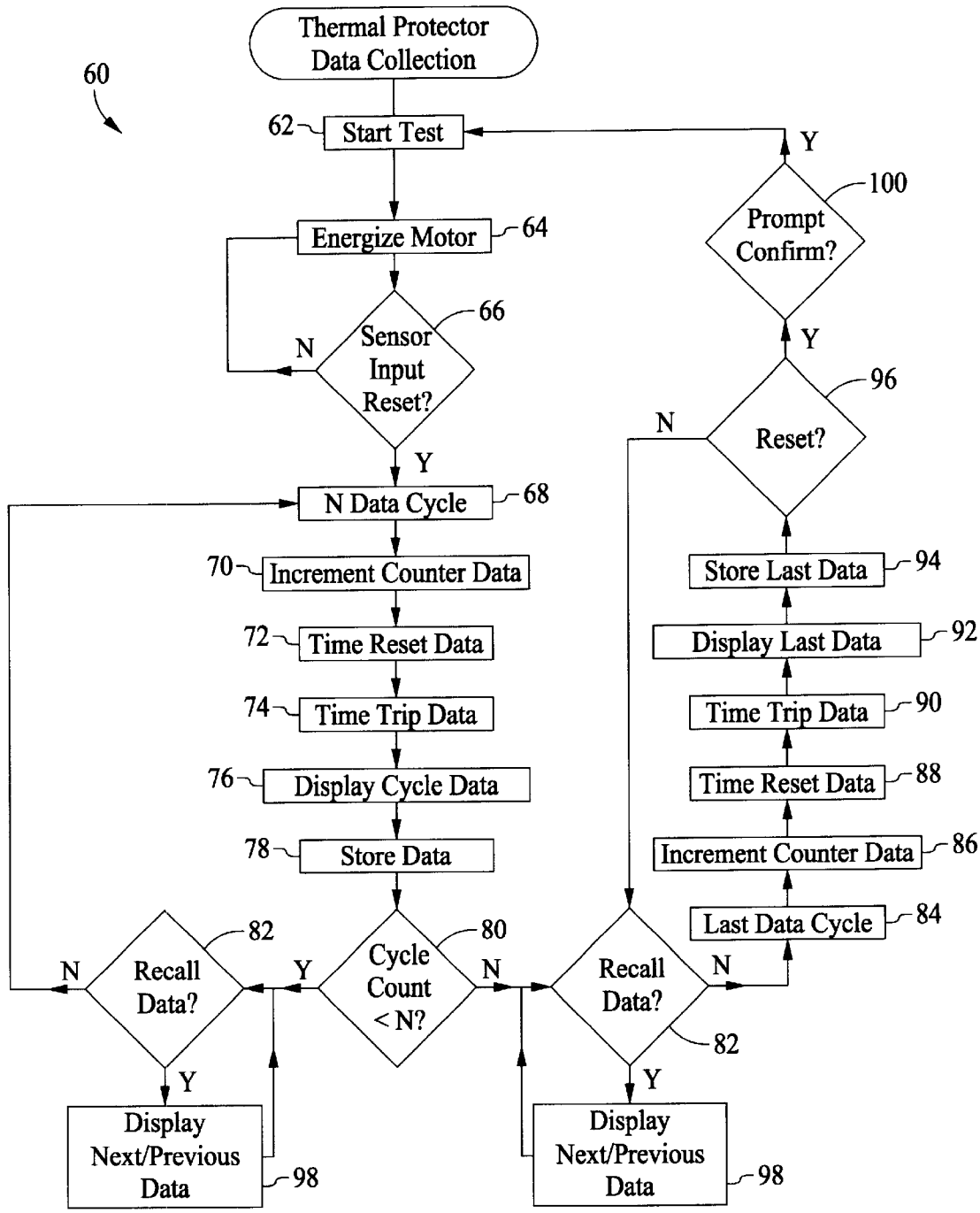
FIG. 2 is a flowchart of a method for collecting thermal protector device test data using the system of FIG. 1.

FIG. 2 is a flowchart of a method 60 for collecting thermal protector data using data collector system 12 (shown in FIG. 1). Once data collector system 12 is coupled in sequence with thermal protector device 14 (shown in FIG. 1) of motor 18 (shown in FIG. 1), and assuming that data collector system memory 22 is reset and ready for a new test (explained below), microprocessor 20 starts 62 motor testing by energizing 64 motor 18 via closing solid state switch 26 (shown in FIG. 1) and coupling motor 18 to power supply 28 (shown in FIG. 1). Microprocessor 20 then checks 66 for an input signal from current sensor 24 (shown in FIG. 1) to begin timing operations. If no input signal is received, microprocessor 20 again attempts to energize 64 motor 18. If the input signal is received, timing operations begin and data collector system 12 enters 68 a data cycle and storage mode to measure and store a predetermined amount of thermal protector device 14 reset and trip times.

When data cycle and storage mode is entered 68, microprocessor 20 increments 70 a cycle counter by 1. Because data collector memory 22 is reset to zero prior to motor testing, the cycle counter is also reset to zero, and the initial cycle is cycle zero plus 1 or cycle "1." Microprocessor 20 times 72 an elapsed reset time that thermal protector device 14 remains in the reset position, and once thermal protector device 14 switches into the trip position, microprocessor 20 times 74 an elapsed time that thermal protector device 14 remains in the trip position. In one embodiment, microprocessor 20 is configured to measure elapsed time to a resolution of 0.1 seconds. As a cycle reset time and trip time data are obtained, microprocessor displays 76 data to a user via display 34 (shown in FIG. 1). As an example, if the measured reset time is 2.0 seconds, and the measured trip time is 2.3 seconds, a message such as "Cyc. (1) On 2.3, Cyc. (2) Off 2.8" is displayed via display 34. Reset time and trip time data are also stored 78 in data collection system memory 22 (shown in FIG. 1) for recall at a later time.

Once cycle data is displayed 76 and stored 78 in system memory 22, microprocessor 20 determines 80 whether the cycle count is less than a pre-determined number of cycles, or "N" cycles. In one embodiment, N is set equal to 5 so that the first five thermal protector device power cycles required by UL standards are stored in system memory 22. In alternative embodiments, other values of N could be used to obtain and store different amounts of data for other purposes, or for different UL standards or tests. If the cycle count is less than N, and a data recall mode is not entered 82, microprocessor 20 enters 68 data cycle and storage mode again. Cycle counter is again incremented 70 by 1, and data cycle and storage mode is repeated for cycles "2," "3," etc. up to cycle "N."

If microprocessor determines 80 that the cycle count is not less than N, i.e., the cycle count is greater than or equal to N, and when data recall mode is not entered 82, then microprocessor 20 enters 84 a last data cycle mode. In last data cycle mode, microprocessor 20 increments 86 the cycle counter to keep a running total of thermal protector device power cycles. Microprocessor 20 measures 88 an elapsed reset time and measures 90 an elapsed trip time for the corresponding cycle, displays 92 the corresponding reset and trip time data, and stores 94 the corresponding data in system memory 22. As an example, if the last measured reset time is 3.0 seconds, and the last measured reset time is 64.5 seconds, a message such as "Last Cyc. 'On' 3.0, Last Cyc. 'Off' 64.8" is displayed 92 via display 34. A current cycle count message, such as, for example, "Current Cycle Count 6" is also displayed 92 to inform a user of the status of testing operations.

If a data reset mode is not entered 96 or data recall mode 82 is not entered by a user, last data cycle mode is again entered 84, and the corresponding reset and trip times overwrite the previous reset time and trip time in system memory 22. In other words, only the current "last cycle" is stored in system memory 22 and is available for recall.

Recall mode may be entered 82 at any time through operator manipulation of "NEXT DATA" input selector 42 (shown in FIG. 1) and "PREVIOUS DATA" input selector 40 (shown in FIG. 1). Hence, if data recall mode is entered 82, microprocessor 20 displays 98 selected data from system memory 22 in accordance with user preference for recording on, for example, a UL standard test form. Up to N cycles and one "last" cycle may be recalled and displayed 98 for user observation.

Reset mode may also be entered 96 at any time via user manipulation of RESET input selector 44 (shown in FIG. 1). When a user depresses the RESET input selector 44, microprocessor 20 enters 96 reset mode and prompts 100 an operator to confirm data reset of data stored in system memory 22, such as by displaying 100 a "Reset Data—Ok? Push Reset—or—No" message on display 34. An operator then presses either RESET input selector 44 or NO RESET input selector 46 (shown in FIG. 1) to either reset or clear data collector memory 22 or to not reset data collector memory 22 and maintain current system memory values. If the user manipulates NO RESET input selector 46, data collection system 12 continues execution of method 60 from the point where data reset mode was entered 96. Prompting 100 confirmation of data reset ensures against unintentional data loss of testing in progress. If data reset is confirmed, all data fields in system memory 22 are set to zero and a message, such as "Data Is Reset. Ready For New Test" is displayed.

The above-described system and method provides a lower cost, user friendly data collection system that avoids reliability and maintenance issues of relatively complicated electromechanical systems known in the art for collecting thermal protector device data.

While the invention has been described in terms of various specific embodiments, those skilled in the art will recognize that the invention can be practiced with modification within the spirit and scope of the claims.

What is claimed is:

1. A method for collecting thermal protector device test data of a motor using a data collector system, the motor including a motor winding and a thermal protector device, the thermal protector device cycling between a reset position and a trip position to cycle power to the motor winding, the data collector including a microprocessor configured to measure elapsed times of reset and trip power cycles of a motor winding through the thermal protector device, a memory for storing the reset and trip times, and an operator interface terminal for displaying the reset and trip times, the operator interface terminal having at least one input selector, said method comprising the step of:

coupling the data collector to the motor;

energizing the motor winding;

measuring a plurality of elapsed reset and trip times of the thermal protector with the microprocessor;

storing the plurality of reset and trip times in the microprocessor memory; and displaying selected stored reset and trip times to an operator with the operator interface terminal in response to manipulation of the input selector.

2. A method in accordance with claim 1 wherein said step of storing the plurality of reset and trip times in the microprocessor memory comprises the step of storing a predetermined number of reset and trip times.

3. A method in accordance with claim 2 further comprising the step of storing only a last reset and last trip time after the predetermined number of reset and trip times have been stored.

4. A method in accordance with claim 3 wherein said step of storing only a last reset and trip time comprises the step of storing only a last reset and trip time after five reset times and five trip times have been stored.

5. A method in accordance with claim 1 further comprising the step of resetting the stored reset and trip times to zero upon user manipulation of the at least one input selector.

6. A method in accordance with claim 1 wherein said step of measuring a plurality of elapsed reset and trip times of the thermal protector with the microprocessor comprises the step of measuring elapsed reset time and elapsed trip time at a resolution of 0.1 seconds.

7. A method in accordance with claim 1 further comprising the step of storing a total number of timed power cycles of the motor winding in the microprocessor memory.

8. A method in accordance with claim 1 further comprising the step of resetting the data collector in response to operator manipulation of the operator interface terminal.

9. A method in accordance with claim 1 further comprising the step of displaying a current cycle count on the operator interface terminal.

10. A system for motor thermal protector data collection for a motor including a motor winding and a thermal protector device, the thermal protector device cycling between a reset position and a trip position to cycle power to the motor winding, said system comprising:

a microprocessor configured to measure elapsed times of reset and trip power cycles of the motor winding through the thermal protector device;

a memory for storing and recalling said elapsed times; and an operator interface terminal coupled to said microprocessor and comprising a display and at least one input selector, said microprocessor and display configured for displaying said elapsed reset and trip times in response to user manipulation of said input selector.

11. A system in accordance with claim 10 wherein said microprocessor is configured to measure said elapsed reset times and trip times at a resolution of 0.1 seconds.

12. A system according to claim 10 wherein said microprocessor is configured to store a pre-determined number of reset and trip times in said memory.

13. A system in accordance with claim 12 wherein said pre-determined number is five.

14. A system in accordance with claim 12 wherein said microprocessor is configured to store said pre-determined number of reset and trip times and thereafter store reset and trip times of a last timed power cycle of the motor winding.

15. A system in accordance with claim 10 wherein said microprocessor is configured to store a total number of timed power cycles of the motor winding.

16. A system in accordance with claim 10 wherein said microprocessor and said memory comprise a programmable logic controller.

17. A system in accordance with claim 10 further comprising a current sensor coupled to said microprocessor and configured for coupling to the motor in series with the thermal protector, said current sensor providing a signal to said microprocessor for measuring said elapsed reset times and said elapsed trip times.

18. A system for motor thermal protector data collection, the motor including a motor winding and a thermal protective device, the thermal protector device cycling between a reset position and a trip position to cycle power to the motor winding, said system comprising:

a programmable logic controller configured to measure a plurality of elapsed times of reset and trip power cycles of the motor winding through the thermal protector device, said programmable logic controller further having a memory for storing said elapsed reset times and said elapsed trip times; and an operator interface terminal coupled to said programmable logic controller and comprising at least one input selector, said operator interface terminal configured to display a pre-determined number of said stored elapsed reset times and said elapsed trip times upon user manipulation of said at least one input selector.

19. A system in accordance with claim 18 wherein said predetermined number of stored elapsed times is five, said pre-determined number of stored trip times is five.

20. A system in accordance with claim 18 further comprising a current sensor coupled to said microprocessor and configured for coupling to the motor in series with the thermal protector device, said current sensor providing a signal to said microprocessor for measuring said elapsed reset times and said elapsed trip times.

* * * * *